US010657528B2

(12) United States Patent
Hammad

(10) Patent No.: US 10,657,528 B2
(45) Date of Patent: May 19, 2020

(54) INTEGRATION OF PAYMENT CAPABILITY INTO SECURE ELEMENTS OF COMPUTERS

(71) Applicant: Visa International Service Association, San Francisco, CA (US)

(72) Inventor: Ayman Hammad, Pleasanton, CA (US)

(73) Assignee: Visa International Service Association, San Francisco, CA (US)

(*) Notice: Subject to any disclaimer, the term of this patent is extended or adjusted under 35 U.S.C. 154(b) by 497 days.

(21) Appl. No.: 15/252,595

(22) Filed: Aug. 31, 2016

(65) Prior Publication Data

US 2016/0371688 A1 Dec. 22, 2016

Related U.S. Application Data

(63) Continuation of application No. 15/167,804, filed on May 27, 2016, now Pat. No. 9,589,268, which is a (Continued)

(51) Int. Cl.
*G06Q 20/40* (2012.01)
*G06F 16/2457* (2019.01)
(Continued)

(52) U.S. Cl.
CPC ......... *G06Q 20/40* (2013.01); *G06F 16/2457* (2019.01); *G06F 21/34* (2013.01);
(Continued)

(58) Field of Classification Search
USPC ........................................................ 235/375
See application file for complete search history.

(56) References Cited

U.S. PATENT DOCUMENTS

| 5,336,870 A | 8/1994 | Hughes et al. |
| 5,365,586 A | 11/1994 | Indeck et al. |

(Continued)

FOREIGN PATENT DOCUMENTS

| CN | 101110113 | 1/2008 |
| CN | 101211436 | 7/2008 |

(Continued)

OTHER PUBLICATIONS

Office Action dated Feb. 6, 2018 in U.S. Appl. No. 13/413,484, 15 pages.

(Continued)

*Primary Examiner* — Michael G Lee
*Assistant Examiner* — David Tardif
(74) *Attorney, Agent, or Firm* — Kilpatrick Townsend & Stockton LLP

(57) ABSTRACT

Methods, secure elements, validation entities, and computer program products for effecting secure communication of payment information to merchants for Internet-based purchases. Payment information for a user's real payment information is installed in a secure element of a computer, the payment information may comprise a pseudo PAN number for the portable consumer device provided by a validation entity. The secure element is shielded from the computer's operating system to thwart hacker attacks. The user accesses the secure element to make a purchase. In response, the secure element contacts the validation entity with the pseudo account number, and in response obtains dynamic payment information that the secure element can used to effect the payment. The dynamic payment information comprises an account number that is different from the pseudo PAN, and which has at least one difference which respect to the user's real payment information.

20 Claims, 3 Drawing Sheets

Related U.S. Application Data continuation of application No. 13/411,400, filed on Mar. 2, 2012, now Pat. No. 9,424,413, which is a continuation-in-part of application No. 12/780,657, filed on May 14, 2010, now Pat. No. 9,038,886, which is a continuation-in-part of application No. 12/712,148, filed on Feb. 24, 2010, now Pat. No. 7,891,560, and a continuation-in-part of application No. 12/878,947, filed on Sep. 9, 2010, now Pat. No. 8,893,967.

(60) Provisional application No. 61/449,507, filed on Mar. 4, 2011.

(51) Int. Cl.
| | |
|---|---|
| *G06Q 20/12* | (2012.01) |
| *G06Q 20/38* | (2012.01) |
| *G06Q 20/42* | (2012.01) |
| *H04L 9/32* | (2006.01) |
| *H04L 29/06* | (2006.01) |
| *G06F 21/34* | (2013.01) |
| *H04L 9/14* | (2006.01) |
| *G06Q 20/22* | (2012.01) |

(52) U.S. Cl.
CPC .......... *G06Q 20/12* (2013.01); *G06Q 20/227* (2013.01); *G06Q 20/385* (2013.01); *G06Q 20/401* (2013.01); *G06Q 20/42* (2013.01); *G06Q 20/425* (2013.01); *H04L 9/14* (2013.01); *H04L 9/3234* (2013.01); *H04L 63/0428* (2013.01); *H04L 63/06* (2013.01); *H04L 63/0853* (2013.01); *H04L 63/102* (2013.01); *H04L 63/1441* (2013.01); *G06F 2221/2129* (2013.01); *H04L 63/126* (2013.01); *H04L 2209/56* (2013.01)

(56) References Cited

U.S. PATENT DOCUMENTS

| | | |
|---|---|---|
| 5,450,537 A | 9/1995 | Hirai et al. |
| 5,550,561 A | 8/1996 | Ziarno |
| 5,613,012 A | 3/1997 | Hoffman |
| 5,625,669 A | 4/1997 | McGregor et al. |
| 5,640,577 A | 6/1997 | Scharmer |
| 5,696,824 A | 12/1997 | Walsh |
| 5,729,591 A | 3/1998 | Bailey |
| 5,742,845 A | 4/1998 | Wagner |
| 5,781,438 A | 7/1998 | Lee |
| 5,794,259 A | 8/1998 | Kikinis |
| 5,883,810 A | 3/1999 | Franklin |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,032,859 A | 3/2000 | Muehlberger et al. |
| 6,044,349 A | 3/2000 | Tolopka et al. |
| 6,044,360 A | 3/2000 | Picciallo |
| 6,055,592 A | 4/2000 | Smith |
| 6,067,621 A | 5/2000 | Yu et al. |
| 6,163,771 A | 12/2000 | Walker |
| 6,227,447 B1 | 5/2001 | Campisano |
| 6,234,389 B1 | 5/2001 | Valliani et al. |
| 6,236,981 B1 | 5/2001 | Hill |
| 6,253,328 B1 | 6/2001 | Smith |
| 6,267,292 B1 | 7/2001 | Walker |
| 6,299,062 B1 | 10/2001 | Hwang |
| 6,327,578 B1 | 12/2001 | Linehan |
| 6,341,724 B2 | 1/2002 | Campisano |
| 6,354,496 B1 | 3/2002 | Murphy et al. |
| 6,385,596 B1 | 5/2002 | Wiser |
| 6,421,729 B1 | 7/2002 | Paltenghe et al. |
| 6,422,462 B2 | 7/2002 | Cohen |
| 6,425,523 B1 | 7/2002 | Shem Ur |
| 6,449,347 B1 | 9/2002 | Ple et al. |
| 6,490,601 B1 | 12/2002 | Markus et al. |
| 6,499,042 B1 | 12/2002 | Markus |
| 6,560,709 B1 | 5/2003 | Galovich |
| 6,571,339 B1 | 5/2003 | Danneels et al. |
| 6,592,044 B1 | 7/2003 | Wong |
| 6,636,833 B1 | 10/2003 | Flitcroft |
| 6,685,095 B2 | 2/2004 | Roustaei et al. |
| 6,738,749 B1 | 5/2004 | Chasko |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,891,953 B1 | 5/2005 | DeMello |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,947,908 B1 | 9/2005 | Slater |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 6,993,658 B1 | 1/2006 | Engberg |
| 7,007,840 B2 | 3/2006 | Davis |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,103,576 B2 | 9/2006 | Mann, III |
| 7,111,324 B2 | 9/2006 | Elteto et al. |
| 7,113,930 B2 | 9/2006 | Eccles |
| 7,136,835 B1 | 11/2006 | Flitcroft |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,210,169 B2 | 4/2007 | Smith et al. |
| 7,216,292 B1 | 5/2007 | Snapper et al. |
| 7,231,045 B1 | 6/2007 | Parrott |
| 7,254,560 B2 | 8/2007 | Singhal |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,379,919 B2 | 5/2008 | Hogan |
| RE40,444 E | 7/2008 | Linehan |
| 7,412,420 B2 | 8/2008 | Holdsworth |
| 7,412,422 B2 | 8/2008 | Shiloh |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,543,738 B1 | 6/2009 | Saunders et al. |
| 7,548,889 B2 | 6/2009 | Bhambri |

(56) References Cited

U.S. PATENT DOCUMENTS

| | | |
|---|---|---|
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,584,153 B2 | 9/2009 | Brown |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Mcato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,226 B2 | 5/2013 | Hammad |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,602,293 B2 | 12/2013 | Hammad |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,827,154 B2 | 9/2014 | Hammad |
| 8,838,982 B2 | 9/2014 | Carlson et al. |
| 8,856,539 B2 | 10/2014 | Weiss |
| 8,887,308 B2 | 11/2014 | Grecia |
| 8,893,967 B2 | 11/2014 | Hammad |
| 9,038,886 B2 | 5/2015 | Hammad |
| 9,065,643 B2 | 6/2015 | Hurry et al. |
| 9,070,129 B2 | 6/2015 | Sheets et al. |
| 9,100,826 B2 | 8/2015 | Weiss |
| 9,105,027 B2 | 8/2015 | Hammad et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,317,848 B2 | 4/2016 | Hammad |
| 9,372,971 B2 | 6/2016 | Hammad |

(56) References Cited

U.S. PATENT DOCUMENTS

| | | |
|---|---|---|
| 9,424,413 B2 | 8/2016 | Hammad |
| 9,530,137 B2 | 12/2016 | Weiss |
| 2001/0029485 A1 | 10/2001 | Brody |
| 2001/0032182 A1 | 10/2001 | Kumar et al. |
| 2001/0032192 A1 | 10/2001 | Putta et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan et al. |
| 2002/0016749 A1 | 2/2002 | Borecki et al. |
| 2002/0023054 A1 | 2/2002 | Gillespie |
| 2002/0029193 A1 | 3/2002 | Ranjan |
| 2002/0035539 A1 | 3/2002 | O'Connell |
| 2002/0035548 A1 | 3/2002 | Hogan |
| 2002/0038286 A1 | 3/2002 | Koren et al. |
| 2002/0044689 A1 | 4/2002 | Roustaei et al. |
| 2002/0059146 A1 | 5/2002 | Keech |
| 2002/0073045 A1 | 6/2002 | Rubin |
| 2002/0077837 A1 | 6/2002 | Krueger et al. |
| 2002/0091877 A1 | 7/2002 | Karidis |
| 2002/0107791 A1 | 8/2002 | Nobrega et al. |
| 2002/0116341 A1 | 8/2002 | Hogan |
| 2002/0128977 A1 | 9/2002 | Nambiar et al. |
| 2002/0133467 A1 | 9/2002 | Hobson |
| 2002/0147913 A1 | 10/2002 | Lun Yip |
| 2002/0170960 A1 | 11/2002 | Ehrensvard et al. |
| 2003/0028481 A1 | 2/2003 | Flitcroft |
| 2003/0038835 A1 | 2/2003 | DeFelice |
| 2003/0057219 A1 | 3/2003 | Risolia |
| 2003/0097561 A1 | 5/2003 | Wheeler |
| 2003/0115142 A1 | 6/2003 | Brickell et al. |
| 2003/0126094 A1 | 7/2003 | Fisher et al. |
| 2003/0130955 A1 | 7/2003 | Hawthorne |
| 2003/0142855 A1 | 7/2003 | Kuo et al. |
| 2003/0191709 A1 | 10/2003 | Elston |
| 2003/0191945 A1 | 10/2003 | Keech |
| 2003/0200184 A1 | 10/2003 | Dominguez et al. |
| 2003/0212642 A1 | 11/2003 | Weller et al. |
| 2004/0010462 A1 | 1/2004 | Moon |
| 2004/0039651 A1 | 2/2004 | Grunzig |
| 2004/0050928 A1 | 3/2004 | Bishop |
| 2004/0058705 A1 | 3/2004 | Morgan et al. |
| 2004/0059682 A1 | 3/2004 | Hasumi |
| 2004/0093281 A1 | 5/2004 | Silverstein |
| 2004/0104268 A1 | 6/2004 | Bailey |
| 2004/0127256 A1 | 7/2004 | Goldthwaite et al. |
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop |
| 2004/0248554 A1 | 12/2004 | Khan et al. |
| 2004/0254890 A1 | 12/2004 | Sancho et al. |
| 2004/0260646 A1 | 12/2004 | Berardi |
| 2004/0267672 A1 | 12/2004 | Gray et al. |
| 2005/0036611 A1 | 2/2005 | Seaton, Jr. et al. |
| 2005/0037735 A1 | 2/2005 | Coutts |
| 2005/0043997 A1 | 2/2005 | Sahota et al. |
| 2005/0065875 A1 | 3/2005 | Beard |
| 2005/0077349 A1 | 4/2005 | Bonalle et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0127164 A1 | 6/2005 | Wankmueller |
| 2005/0156026 A1 | 7/2005 | Ghosh |
| 2005/0187873 A1 | 8/2005 | Labrou |
| 2005/0199709 A1 | 9/2005 | Linlor |
| 2005/0246293 A1 | 11/2005 | Ong |
| 2005/0250538 A1 | 11/2005 | Narasimhan |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0026098 A1 | 2/2006 | Peckover et al. |
| 2006/0131390 A1 | 6/2006 | Kim |
| 2006/0142058 A1 | 6/2006 | Elias et al. |
| 2006/0168653 A1 | 7/2006 | Contrera |
| 2006/0175396 A1 | 8/2006 | Call et al. |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2006/0294095 A1 | 12/2006 | Berk et al. |
| 2007/0005685 A1 | 1/2007 | Chau et al. |
| 2007/0022058 A1 | 1/2007 | Labrou |
| 2007/0083444 A1 | 4/2007 | Matthews et al. |
| 2007/0107044 A1 | 5/2007 | Yuen |
| 2007/0114274 A1 | 5/2007 | Gibbs |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0178883 A1 | 8/2007 | Nandagopal |
| 2007/0179885 A1 | 8/2007 | Bird |
| 2007/0185820 A1 | 8/2007 | Talker |
| 2007/0185821 A1 | 8/2007 | Wells et al. |
| 2007/0208671 A1 | 9/2007 | Brown |
| 2007/0228148 A1 | 10/2007 | Rable |
| 2007/0245414 A1 | 10/2007 | Chan |
| 2007/0272743 A1 | 11/2007 | Christie et al. |
| 2007/0284433 A1 | 12/2007 | Domenica et al. |
| 2007/0284443 A1 | 12/2007 | Anson et al. |
| 2007/0288377 A1 | 12/2007 | Shaked |
| 2007/0290034 A1 | 12/2007 | Routhenstein |
| 2007/0291995 A1 | 12/2007 | Rivera |
| 2008/0001744 A1 | 1/2008 | Batra et al. |
| 2008/0011823 A1 | 1/2008 | Patel |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad et al. |
| 2008/0035738 A1 | 2/2008 | Mullen |
| 2008/0040276 A1 | 2/2008 | Hammad et al. |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1* | 3/2008 | Mullen ............... G06K 19/077 235/494 |
| 2008/0065554 A1 | 3/2008 | Hogan |
| 2008/0065555 A1 | 3/2008 | Mullen |
| 2008/0071681 A1 | 3/2008 | Khalid |
| 2008/0097925 A1 | 4/2008 | King |
| 2008/0103984 A1 | 5/2008 | Choe |
| 2008/0110983 A1 | 5/2008 | Ashfield |
| 2008/0120214 A1 | 5/2008 | Steele et al. |
| 2008/0142582 A1 | 6/2008 | Corioni et al. |
| 2008/0154770 A1 | 6/2008 | Rutherford et al. |
| 2008/0162312 A1 | 7/2008 | Sklovsky et al. |
| 2008/0177796 A1 | 7/2008 | Eldering |
| 2008/0201264 A1 | 8/2008 | Brown |
| 2008/0201265 A1 | 8/2008 | Hewton |
| 2008/0203152 A1 | 8/2008 | Hammad |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0275779 A1 | 11/2008 | Lakshminarayanan |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0305769 A1 | 12/2008 | Rubinstein et al. |
| 2008/0306876 A1 | 12/2008 | Horvath et al. |
| 2008/0313264 A1 | 12/2008 | Pestoni |

(56) References Cited

U.S. PATENT DOCUMENTS

| | | |
|---|---|---|
| 2008/0319869 A1 | 12/2008 | Carlson et al. |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0018959 A1 | 1/2009 | Doran et al. |
| 2009/0037333 A1 | 2/2009 | Flitcroft |
| 2009/0037388 A1 | 2/2009 | Cooper et al. |
| 2009/0043702 A1 | 2/2009 | Bennett |
| 2009/0044268 A1 | 2/2009 | Tak |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith et al. |
| 2009/0106160 A1 | 4/2009 | Skowronek |
| 2009/0124234 A1 | 5/2009 | Fisher |
| 2009/0125446 A1 | 5/2009 | Saunders et al. |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0160617 A1 | 6/2009 | Mullen |
| 2009/0173782 A1 | 7/2009 | Muscato |
| 2009/0200371 A1* | 8/2009 | Kean .................... G06F 21/31 235/379 |
| 2009/0219430 A1 | 9/2009 | Okamoto et al. |
| 2009/0248583 A1 | 10/2009 | Chhabra |
| 2009/0249462 A1 | 10/2009 | Chhabra |
| 2009/0254986 A1 | 10/2009 | Harris et al. |
| 2009/0255987 A1 | 10/2009 | Olivares Baena |
| 2009/0265260 A1 | 10/2009 | Aabye et al. |
| 2009/0276347 A1 | 11/2009 | Kargman |
| 2009/0281948 A1 | 11/2009 | Carlson |
| 2009/0289110 A1 | 11/2009 | Regen et al. |
| 2009/0292631 A1 | 11/2009 | Wells et al. |
| 2009/0294527 A1 | 12/2009 | Brabson |
| 2009/0307139 A1 | 12/2009 | Mardikar |
| 2009/0307140 A1 | 12/2009 | Mardika |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau |
| 2010/0008535 A1 | 1/2010 | Abulafia |
| 2010/0023400 A1 | 1/2010 | Dewitt |
| 2010/0088237 A1 | 4/2010 | Wankmueller |
| 2010/0094755 A1 | 4/2010 | Kloster |
| 2010/0100481 A1 | 4/2010 | Doran et al. |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0133335 A1 | 6/2010 | Maguid |
| 2010/0138347 A1 | 6/2010 | Chen |
| 2010/0145860 A1 | 6/2010 | Pelegero |
| 2010/0161433 A1 | 6/2010 | White |
| 2010/0174556 A1 | 7/2010 | Wilkins et al. |
| 2010/0176935 A1 | 7/2010 | Phillips |
| 2010/0185545 A1* | 7/2010 | Royyuru ................ G06Q 20/04 705/67 |
| 2010/0186073 A1 | 7/2010 | Curtis |
| 2010/0191613 A1 | 7/2010 | Raleigh |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0260388 A1 | 10/2010 | Garrett |
| 2010/0274692 A1 | 10/2010 | Hammad |
| 2010/0274721 A1 | 10/2010 | Hammad |
| 2010/0291904 A1 | 11/2010 | Mfeldt |
| 2010/0293189 A1 | 11/2010 | Hammad |
| 2010/0293381 A1 | 11/2010 | Hammad |
| 2010/0293382 A1 | 11/2010 | Hammad |
| 2010/0299267 A1 | 11/2010 | Faith et al. |
| 2010/0306076 A1 | 12/2010 | Taveau |
| 2010/0318801 A1 | 12/2010 | Roberge et al. |
| 2010/0325041 A1 | 12/2010 | Berardi |
| 2010/0327054 A1 | 12/2010 | Hammad |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0108623 A1 | 5/2011 | Hammad |
| 2011/0125597 A1 | 5/2011 | Oder, II et al. |
| 2011/0140841 A1 | 6/2011 | Bona |
| 2011/0153437 A1 | 6/2011 | Archer |
| 2011/0153498 A1 | 6/2011 | Makhotin et al. |
| 2011/0154466 A1 | 6/2011 | Harper |
| 2011/0154467 A1 | 6/2011 | Bomar et al. |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0208658 A1 | 8/2011 | Makhotin |
| 2011/0238511 A1 | 9/2011 | Park |
| 2011/0238573 A1 | 9/2011 | Varadarajan |
| 2011/0238579 A1 | 9/2011 | Coppinger |
| 2011/0240740 A1 | 10/2011 | Li et al. |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307710 A1 | 12/2011 | McGuire et al. |
| 2012/0018506 A1 | 1/2012 | Hammad et al. |
| 2012/0018511 A1 | 1/2012 | Hammad |
| 2012/0024946 A1 | 2/2012 | Tullis et al. |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1 | 5/2012 | Hammad et al. |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |

(56) References Cited

U.S. PATENT DOCUMENTS

| | | |
|---|---|---|
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0091028 A1 | 4/2013 | Oder, II et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238499 A1 | 9/2013 | Hammad |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0061302 A1 | 3/2014 | Hammad |
| 2014/0068706 A1 | 3/2014 | Aissi |
| 2014/0074637 A1 | 3/2014 | Hammad |
| 2014/0108172 A1 | 4/2014 | Weber et al. |
| 2014/0110477 A1 | 4/2014 | Hammad |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134537 A1 | 5/2015 | Hammad |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |

(56) References Cited

U.S. PATENT DOCUMENTS

| | | |
|---|---|---|
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0317625 A1 | 11/2015 | Hammad |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0379515 A1 | 12/2015 | Hammad |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0275501 A1 | 9/2016 | Hammad |
| 2016/0371688 A1 | 12/2016 | Hammad |
| 2017/0300884 A1 | 10/2017 | Hammad |
| 2018/0005238 A1 | 1/2018 | Hammad |

FOREIGN PATENT DOCUMENTS

| | | |
|---|---|---|
| CN | 101485128 | 7/2009 |
| CN | 101512957 | 8/2009 |
| CN | 101582121 | 11/2009 |
| CN | 103270524 | 8/2013 |
| EP | 1168265 | 1/2002 |
| EP | 1840814 A1 | 10/2007 |
| EP | 2098985 | 9/2009 |
| EP | 2156397 | 2/2010 |
| GB | 2459850 | 11/2009 |
| JP | 2008-210370 | 9/2008 |
| KR | 10-2000-0054496 | 9/2000 |
| KR | 10-2003-0020189 A | 3/2003 |
| KR | 10-2005-0019674 A | 3/2005 |
| KR | 10-2006-0022304 A | 3/2006 |
| KR | 10-2006-0096821 A | 9/2006 |
| KR | 10-2006-0111200 A | 10/2006 |
| KR | 10-2007-0100076 | 10/2007 |
| KR | 10-2008-0026802 | 3/2008 |
| KR | 10-2008-0039330 | 5/2008 |
| KR | 10-2008-0051198 A | 6/2008 |
| KR | 10-2009-0021388 | 3/2009 |
| KR | 10-2009-0044619 | 5/2009 |
| KR | 10-2010-0110642 | 10/2010 |
| RU | 2252451 | 5/2005 |
| RU | 2331110 C2 | 8/2008 |
| RU | 2011148229 | 6/2013 |
| WO | 01/16900 | 3/2001 |
| WO | 2001/017296 A1 | 3/2001 |
| WO | 2001/084509 A2 | 11/2001 |
| WO | 2001088785 A1 | 11/2001 |
| WO | 02/01520 | 1/2002 |
| WO | 2001035304 | 5/2002 |
| WO | 02/059727 | 8/2002 |
| WO | 03/047208 | 6/2003 |
| WO | 3073389 | 9/2003 |
| WO | 2003075192 A1 | 9/2003 |
| WO | 2004042536 | 5/2004 |
| WO | 2005001618 | 1/2005 |
| WO | 2005001635 | 1/2005 |
| WO | 2005073931 A2 | 8/2005 |
| WO | 2005/109360 | 11/2005 |
| WO | 2006113834 | 10/2006 |
| WO | 2008/014554 | 2/2008 |
| WO | 2009/003030 A2 | 12/2008 |
| WO | 2009/025605 | 2/2009 |
| WO | 2009032523 | 3/2009 |
| WO | 2009/052634 | 4/2009 |
| WO | 2009136404 A2 | 12/2009 |
| WO | 2010078522 | 7/2010 |
| WO | 2010129357 | 11/2010 |
| WO | 2011057007 | 5/2011 |
| WO | 2011031988 | 7/2011 |
| WO | 2006/099294 | 3/2012 |
| WO | 2012054763 | 4/2012 |
| WO | 2012058309 | 5/2012 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

Notice of Allowance dated Feb. 12, 2018 in U.S. Appl. No. 15/070,446, 10 pages.
U.S. Appl. No. 12/780,801, filed May 14, 2010, 2010-0274692 A1.
U.S. Appl. No. 14/681,668, filed Apr. 8, 2015, 2015-0317625 A1.
U.S. Appl. No. 13/963,538, filed Aug. 9, 2013, 2014-0110477 A1.
U.S. Appl. No. 13/411,400, filed Mar. 2, 2012, 2012-0226582 A1.
U.S. Appl. No. 14/511,034, filed Oct. 9, 2014, 2015-0134537 A1.
U.S. Appl. No. 14/071,040, filed Nov. 4, 2013, 2014-0061302 A1.
U.S. Appl. No. 15/167,804, filed May 27, 2016.
Gillick, Kevin, "Trusted Execution Environment (TEE) Guide," Global Platform, Feb. 12, 2012, https://web.archive.org/web/20120212221931/http://www.globalplatform.org/mediaguidetee.asp.
"2.4.2 How VISA Card Verification Values are Used," 2.4.2 "z/Os V1R3.0 ICSF Application Programmer's Guide" IBM Library Server, 1 page, © Copyright IBM Corp. 1997, 2002, downloaded Mar. 27, 2012 from URL: http://publibz.boulder.ibm.com/cgi-bin/bookmgr_OS390/BOOKS/CSFB4Z20/2.4.2?SHEL.
Notice of Allowance dated Mar. 1, 2016 in U.S. Appl. No. 13/411,400, 11 pages.
Security Concerns Usher in "Disposable" Credit Cards, Credit Card News, Sep. 15, 2000, 1 page.
Office Action dated Aug. 28, 2015 in U.S. Appl. No. 13/411,400, 19 pages.
Reisinger, D., "PayPal offers SMS security key for mobile users," Nov. 24, 2008, pp. 1-3, © Copyright CBS Interactive, downloaded Mar. 27, 2012 from URL: http://news.cnet.com/8301-17939_1209-10106410-2.html.
Notice of Allowance dated Jun. 15, 2017 in U.S. Appl. No. 14/732,294, 9 pages.
U.S. Appl. No. 13/413,484, filed Mar. 6, 2012, 2013-0238499 A1.
U.S. Appl. No. 14/732,294, filed Jun. 5, 2016, 2015-0379515 A1.
U.S. Appl. No. 15/258,258, filed Sep. 7, 2016.
U.S. Appl. No. 15/167,804, filed May 27, 2016, 2016-0275501 A1.
U.S. Appl. No. 15/070,446, filed Mar. 15, 2016, 2016-0197725 A1.
U.S. Appl. No. 12/780,301, filed May 14, 2010, 2010-0274692 A1.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.

(56) References Cited

OTHER PUBLICATIONS

Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-to-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
Mcguire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Notice of Allowance dated Jun. 15, 2016 in U.S. Appl. No. 14/511,034, 7 pages.
Office Action dated Aug. 25, 2016 in U.S. Appl. No. 14/681,668, 13 pages.
Office Action dated Apr. 20, 2017 in U.S. Appl. No. 14/681,668, 14 pages.
European Examination Report dated Nov. 11, 2016 in EP 10772579.8, 8 pages.
Office Action dated Jul. 14, 2017 in U.S. Appl. No. 15/070,446, 8 pages.
Final Office Action dated Aug. 27, 2018 in U.S. Appl. No. 13/413,484, 18 pages.
Notice of Allowance dated Mar. 21, 2019 in U.S. Appl. No. 15/977,921, 10 pages.

\* cited by examiner

INTEGRATION OF PAYMENT CAPABILITY INTO SECURE ELEMENTS OF COMPUTERS

CROSS-REFERENCES TO RELATED APPLICATIONS

This application is a continuation of U.S. patent application Ser. No. 15/167,804, filed on May 27, 2016, which is a continuation application of U.S. patent application Ser. No. 13/411,400, entitled "Integration of Payment Capability into Secure Elements of Computers," filed Mar. 2, 2012, which is a continuation-in-part of prior application Ser. No. 12/780,657, entitled "Verification of Portable Consumer Devices," filed May 14, 2010, which is a continuation-in-part of prior application Ser. No. 12/712,148, entitled "Verification of Portable Consumer Devices," filed Feb. 24, 2010, the contents of which are hereby incorporated in their entirety by reference for all purposes. This application is also a continuation in part of prior application Ser. No. 12/878,947, entitled "Secure Communication of Payment Information to Merchants Using a Verification Token," filed Sep. 9, 2010, the contents of which are hereby incorporated in their entirety by reference for all purposes. In addition, this application claims priority to U.S. Provisional Patent Application No. 61/449,507, entitled "Integration of Payment Capability into Secure Elements of Computers," filed Mar. 4, 2011, the contents of which are hereby incorporated in their entirety by reference for all purposes.

BACKGROUND OF THE INVENTION

Online purchasing of goods and services has grown dramatically over the last decade. Although such purchases are now conducted with communications between a user's computer and a merchant's website being encrypted, the users' credit card payment information is still susceptible to theft during the online transaction. A common approach used by hackers to steal credit card payment information is to install a malware program on the user's computer without the user's knowledge, where the malware program examines the user's keystrokes and browser content to detect payment information (e.g., credit card number, expiration date, card verification value, etc.). This is the so-called "man-in-the-middle" attack. Once the payment information is detected, the malware program transmits the data to the hacker's remote server, where it can be used or sold to conduct fraudulent transactions.

The present invention is directed to ways of evading man-in-the-middle attacks and effecting secure communication of payment information to merchants for purchases made over the Internet.

BRIEF SUMMARY OF THE INVENTION

One exemplary embodiment of the invention pertains to methods of installing user-specific payment information in a secure element of a computer, the user-specific payment information having at least an account number (personal account number—PAN), and one or more of the following: a card verification value, an expiration date, and a billing zip code. An exemplary method comprises receiving, at a secure element of a computer, an account number and at least one of an expiration date, a card verification value, or a billing ZIP code of a user-specific payment information; obtaining an identifier for the secure element; sending the received account number, the received at least one of an expiration date, a card verification value, or a billing ZIP code, and the obtained identifier for the secure element to a validation entity; receiving, in response, a pseudo account number from the validation entity, the received pseudo account number being different from the received account number of the user-specific payment information; and storing, in a memory of the secure element, the received pseudo account number. The user-specific payment information is uniquely assigned to a user, and may be the payment information of a user's portable consumer device (e.g., a primary credit card account assigned by a bank), or sub-account linked to the primary account and limited to particular commerce channels and/or particular transactions (such as internet purchases), or a proxy account number linked to the primary credit card account and limited to use with the secure element. Each of the account number of the user-specific payment information and the pseudo account number is recognizable and processable by a card payment processing network that processes credit-card and/or debit-card transactions, such as VisaNet™. The payment processing network is independent of the bank that issued the user-specified payment information, and the merchants involved with the user's transactions. Also, each account number comprises a sequence of at least eleven numeric digits, preferably of at least 13 numeric digits, and typically is a sequence of 15, 16, 17, 18, or 19 numeric digits. The identifier for the secure element may be assigned by the manufacturer of the secure element of the computer and written to a non-volatile memory of the secure element, or may be written to a non-volatile memory of the secure element by a payment application installed in the secure element.

Another exemplary embodiment of the invention pertains to methods of using the secure payment information in a secure element of a computer for a user. Such an exemplary method comprises: receiving an indication that the payment application in the secure element is to be activated by the user; sending, from the secure element of the computer, a representation of a pseudo account number stored in a computer readable memory of the secure element to a validation entity; and receiving, in response, dynamic payment information from the validation entity, the received dynamic payment information having an account number that is different from the pseudo account number. The dynamic payment information is recognizable and processable by a card payment processing network that processes credit-card and/or debit-card transactions, such as VisaNet™. The dynamic payment information comprises an account number of at least eleven numeric digits, preferably of at least 13 numeric digits, and typically of 15, 16, 17, 18, or 19 numeric digits.

Additional embodiments of the present invention pertain to computer product products that perform the above methods, and secure elements that have computer readable memories that store these computer program products and processors that execute the stored computer program products. For example, one such exemplary embodiment pertains to a computer program product embodied on a tangible non-transitory computer-readable medium. The exemplary product comprises: code that directs a data processor to receive an account number and at least one of an expiration date, a card verification value, or a billing ZIP code of user-specific payment information; code that directs a data processor to obtain an identifier for a secure element; code that directs a data processor to send the received account number, the received at least one of an expiration date, a card verification value, or a billing ZIP code, and the obtained identifier for the secure element to a validation entity; code that directs a data processor to receive, in response, a pseudo account number from the validation entity, the received pseudo account number being different from the account number of the received user-specific payment information; and code that directs a data processor to store, in a memory of the secure element, the received pseudo account number.

Another exemplary embodiment of the invention pertains to methods of providing payment information to a secure element that may be stored by the secure element. Such an exemplary method comprises: receiving, at a server, a request from a secure element of a computer to provide a pseudo account number, the request including an identifier of the secure element, and an account number and at least one of an expiration date, a card verification value, or a billing ZIP code of user-specific payment information; applying at least one validation test pertaining to the received request; sending, if the at least one validation test is passed, a pseudo account number to the secure element; and storing the pseudo account number with an indication of at least the received account number.

Another exemplary embodiment of the invention pertains to methods of providing dynamic payment information to a secure element that may be used by the secure element to pay for a transaction. Such an exemplary method comprises: receiving, at a server, a request from a secure element of a computer to provide dynamic payment information, the request including a pseudo account number and an identifier of a secure element; applying at least one validation test pertaining to the received request; and sending, if the at least one validation test is passed, dynamic payment information to the secure element.

Additional embodiments of the present invention pertain to computer product products that perform the above methods, and validation entities that have computer readable memories that store these computer program products and processors that execute the stored computer program products. For example, one such exemplary embodiment pertains to a validation entity and comprises: a data processor; a networking facility coupled to the processor; a computer-readable medium coupled to the processor; and a computer program product embodied on the computer-readable medium. An exemplary embodiment of the computer program product comprises: code that directs a data processor to receive a request from a secure element of a computer to provide a pseudo account number, the request including an identifier of the secure element, and an account number and at least one of an expiration date, a card verification value, or a billing ZIP code of user-specific payment information; code that directs a data processor to apply at least one validation test pertaining to the received request; code that directs a data processor to send, if the at least one validation test is passed, a pseudo account number to the secure element; and code that directs a data processor to store the pseudo account number with an indication of at least the received account number. The exemplary computer program product may further comprise: code that directs a data processor to receive a request from a secure element of a computer to provide dynamic payment information, the request including a pseudo account number and an identifier of a secure element; code that directs the data processor to apply at least one validation test pertaining to the received request; and code that directs a data processor to send, if the at least one validation test is passed, dynamic payment information to the secure element.

Further details regarding embodiments of the invention are provided below in the Detailed Description with reference to the Figures.

DETAILED DESCRIPTION OF THE INVENTION

The present invention is directed to ways of effecting secure communication of payment information to merchants for purchases made over the Internet. Exemplary embodiments of the present invention involve the incorporation of payment information (e.g., credit card or debit card payment information) into secure elements of specially designed computers, and the use of the incorporated payment information to purchase a product or service from a merchant by way of the merchant's website with a highly improved degree of security. The secure element of the computer is described below in greater detail. As a brief summary, the secure element provides a hardware-level interface with the user which cannot be controlled or accessed by the operating system running on the computer, and is thus immune from being hacked by computer viruses that may be inadvertently installed on the user's computer. The secure element can be accessed by the user by hitting a particular key or sequence of keys on the computer or the computer's keyboard, or by the user clicking a button provided on a browser toolbar provided by a special browser plug-in. When activated, the secure element can access the user interface of the computer (e.g., screen, keyboard, and mouse), and can prevent keyboard keystrokes, mouse clicks, mouse movements, and screen cursor position information from being sent to the operating system that is running on the computer. The secure element can also access the networking facility of the user's computer, either directly or indirectly through the operating system, to securely communicate with a validation server. The validation server assists the user in conveying payment information to a merchant website for a purchase transaction. This server may be provided by an issuing bank or a payment processing network, such as VisaNet™. The secure element may comprise its own data processor and memory, and may further have switching circuitry that selectively connects and disconnects the screen, keyboard, and mouse from the I/O controller of the computer. A payment application is installed on the secure element and executed by the processor of the secure element. The payment application handles the processing of payment information and communicates with the user and the validation entity.

Figure 1:
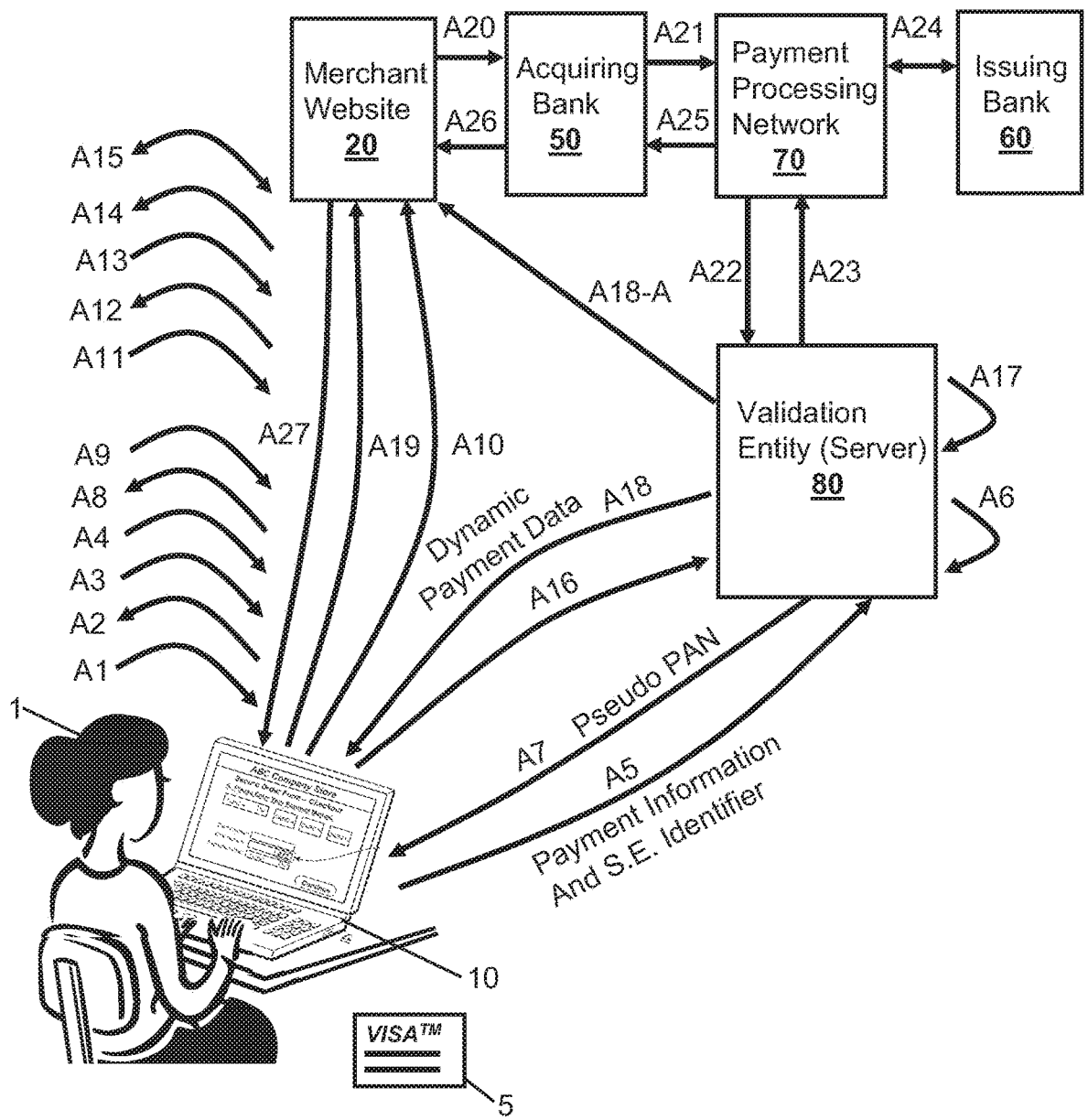
FIG. 1 illustrates exemplary actions pertaining to various methods, secure elements, and validation entities according to the present invention.

FIG. 1 illustrates exemplary actions A1-A27 that may be used to implement payment interactions between a user 1, a merchant website 20, a computer 10 that is used by user 1 to make a purchase from website 20, and a validation entity 80. In action A1, user 1 activates the secure element of computer 10 by pressing a special key on the browser window (which may be set up in a tool bar provided by a browser plug-in), or by pressing a special key or a combination of regular keys on the computer's keyboard. (The use of a special key can be advantageous for laptop, PDA, and smart phone implementations.) In response, in action A2, the secure element disconnects the computer's user interface from the operating system running on the computer, and presents a dialog box on the computer screen that asks the user to enter a password. The password may be entered by using the computer's keyboard, or by the user clicking an image of a keyboard or a 0-9 numerical keypad displayed on the computer screen by the secure element. In action A3, user 1 enters the password, which allows full access to the secure element. In the full access state, user 1 can have access to the aforementioned payment application that has been previously installed in the memory of the secure element. The payment application may automatically start upon receipt of a correct password, or the secure element can present a secure "desktop" screen to the user, with this secure screen having an icon that user 1 can click on to start the payment application. The secure "desktop" screen may be smaller than the regular desktop screen, and may be laid over a portion of the regular desktop so that the user can still see portions of the regular desktop. Upon activation, the payment application may present its own sequence of dialog boxes, just like a regular application running from the regular desktop. The payment application enables user 1 to register an instance (e.g., datum) of user-specific payment information, such as credit card or debit card information, with the payment application and validation entity 80 for use with future transactions with merchant websites, such as merchant website 20. In action A4, user 1 instructs the payment application to register an instance of user-specific payment information. In action A4, user 1 provides the following fields of the instance of user-specific payment information: the PAN (personal account number), the name of the card holder, card expiration date (if applicable), card verification value (CVV, if applicable), and card holder billing address and/or billing zip code. The user-specific payment information is uniquely assigned to user 1, and may be the payment information of a portable consumer device 5 of the user (e.g., a primary credit card account assigned by a bank), or sub-account linked to the primary account and limited to particular commerce channels and/or particular transactions (such as internet purchases), or a proxy account number linked to the primary credit card account and limited to use with secure elements. In action A5, the payment application encrypts the payment information provided by user 1, accesses the computer's networking facility to contact validation entity 80, and securely communicates the payment information to entity 80 along with an identifier that uniquely identifies the secure element. The identifier for the secure element may be assigned by the manufacturer of the secure element of the computer and written to a non-volatile memory of the secure element, or may be written to a non-volatile memory of the secure element by the payment application. The unique identifier for the secure element is different from every serial number that the computer manufacturer has encoded into the CPU, memory, and firmware of computer 10, and preferably cannot be derived therefrom by using a single mathematical operation. As such, the identifier for the secure element is not accessible to the operating system.

Entity 80 validates the received instance of user-specific payment information in action A6, and sends back a pseudo account number (pseudo-PAN) to the payment application running on the secure element in action A7. The pseudo account number (pseudo-PAN) is different from the real account number (PAN) provided to it by user 1, and preferably cannot be derived from it by using a single mathematical operation. In addition, the pseudo-PAN preferably has the form of a PAN that can be processed by payment processing network (such as network 70 described below), being a string (sequence) of at least 11 numeric digits, preferably of at least 13 numeric digits, and typically being a sequence of 15, 16, 17, 18, or 19 numeric digits, but preferably not more than 20 digits. As part of action A6, entity 80 creates a computer record that stores and associates the following items: the user-specific payment information provided by user 1, the pseudo account number (pseudo-PAN), and the unique identifier of the secure element. In action A8, the payment application provides user 1 with an indication that the payment information has been registered, and provides an icon or other representation that the user may click on or select at a later date to send the payment information to a merchant website 20. This icon or representation may comprise the name of the bank that issued the user-specific payment information plus the last 3 to 5 digits of the real PAN of the user-specific payment information. Also, the payment application may provide an input dialog box that allows user 1 to create a name for the registered payment information. In action A9, user 1 clicks on an icon or representation in the payment application to close it, and further clicks on another icon or representation to exit the secure element, the action of which restores the operating system's access to the computer's user interface. To protect the security of the user's real payment information, such as from a reverse engineering of secure element 40, the payment application running on the secure element does not permanently store the PAN, CVV, and expiration date of the user-specific payment information that was provided to it by the user. Instead, the payment application can relay this information to the validation server 80 without any local storage of the information.

At a later time, user 1 shops at merchant website 20, finds one or more products or services to purchase, and navigates to the website's checkout page to pay for the transaction. These actions are indicated at A10 in the figure. At the checkout page, user 1 activates the secure element in action A11 by pressing a special key on the browser (which may be set up in a tool bar provided by a browser plug-in), or by pressing a special key or a combination regular keys on the computer's keyboard, as indicated above. At action A12, the secure element displays the secure screen and asks for the user's password, as described above. In action A13, user 1 enters the password, which allows full access to the secure element when correctly entered. Upon confirmation of the correct password, the secure element takes action A14 to automatically start the payment application or to present the secure desktop screen to enable user 1 to start the payment application. Once started, if the user has previous registered a number of instances of user-specific payment information (e.g., a number of portable consumer devices) with the payment application, the payment application may present a dialog box to user 1 with icons/representations of each of them to enable the user to select one of them (e.g., one of the portable consumer devices, or cards) to use for payment. If only one instance of user-specific payment information has been registered, the payment application may present a dialog box to confirm use of the instance (and to allow another instance or portable consumer device to be registered and used if desired), or the payment application may be configured to proceed to use the sole registered instance (e.g., portable consumer device) without confirmation from the user. These interactions are indicated at A15 in the figure. Once the payment application has selected a portable consumer device to use for payment, the payment application generates a cryptogram based on the pseudo-PAN and other info, and sends the cryptogram to validation entity 80 through a networking facility of the user's computer 10, as denoted by action A16 in the figure. The cryptogram sent in action A16 can also have the previously-described identifier that uniquely identifies the secure element. This identifier can be used by entity 80 to ensure that it is communicating with a trusted entity. As a further security feature, one of actions A11-A14 can include obtaining a unique identifier for merchant 20, and action 16 can include the merchant identifier in the cryptogram, or transmit it along with the cryptogram. Entity 80 may then use the merchant identifier to either directly communicate payment information to the merchant, or to instruct the payment processing network (described below) to only process the transaction with the merchant indicated by the identifier. The merchant identifier may be obtained from the active web browser, either as the URL of the merchant checkout page or a data field in the contents of the checkout page, and may be displayed to the user within the secure environment of the secure element to confirm the identity of the merchant.

Validation entity 80 determines if the cryptogram is valid, as denoted by action A17, and if valid, it generates return payment information and associates the return information to the user's account. The validation process includes accessing the previously stored record for the user's user-specific payment information (e.g., the user's portable consumer device) based on the value of the received pseudo-PAN, and may include comparing the received identifier of the secure element with identifier of the secure element that was previously stored in the accessed record. The validation process may also include checking a database of fraudulent activity related to the pseudo-PAN and the corresponding real account number of the user, and/or the identity of the secure element. The return payment information may comprise a dynamic PAN number (dPAN) plus a dynamic card verification value (dCVV2), or the real PAN number plus a dCVV2 value, or a dPAN or real PAN plus a dynamic expiration date, with an optional dCVV2 value. The dynamic PAN is different from the pseudo-PAN and the corresponding real PAN of the user's user-specific payment information (e.g., the payment information for portable consumer device 5). The dPAN, dCVV2, and dynamic expiration date are referred to as being "dynamic" since their values vary with time. Each may have the same value over a designated period of time, or each may change with each request made to validation entity 80. The return payment information may be referred to as a dynamic payment information because at least one of its data fields has a value that varies with time. The use of the dynamic dPAN is currently preferred over the use of the real PAN. In action A18, validation entity 80 sends the return (dynamic) payment information to the payment application running on the secure element of computer 10. Action A18 may also include sending shipping information. Previous action A17 preferably includes storing the return payment information in entity 80 with an indication of the user's user-specific payment information (e.g., the real account information), and optionally with an indication of the merchant identifier. This will facilitate the processing of the transaction through the card payment system, as described below in greater detail.

At this point, payment for the transaction with merchant 20 may be completed in several different ways. As a first way, the payment application may cause the returned dynamic payment information to be displayed in a window of the browser or another type of window of the operating system, so that the user can copy the dynamic payment information into the merchant's checkout page, either by hand or by cut-and-paste tools of the operating system. To do this, the payment application may pass the dynamic payment information to a companion application running under the computer's operating system, and the companion application may display the dynamic payment information to the user. As a second way, the payment application can pass the dynamic payment information to a companion application running under the operating system, and the companion application can locate the merchant's checkout page on computer 10 and insert (form fill) the dynamic payment information into the fields of the checkout page. In either case, user 1 can exit from the secure element interface and return to the interface provided by the operating system and then submit the checkout page with the filled-in payment information to merchant 20 for processing. This action is denoted by action A19 in the figure. Merchant website 20 may then sends the received dynamic payment information to acquiring bank 50 to process the transaction. As a third way, validation entity 80 may send the dynamic payment information directly to merchant website 20, as shown by action A18-A in the figure, along with information about user 1 and/or the user's browser session with the merchant that may have been previously collected in one or more of actions A11-A14 and sent to entity 80 in action A16. Merchant website 20 can use this additional information to correlate the received dynamic payment information to the user's browser session, and can resend the checkout page to computer 10 with an indication that the PAN, CVV, and expiration date data have been received (such as showing asterisks in these fields). As another approach, entity 80 can provide merchant 80 with the user's name and a portion of the user's real PAN, and merchant 80 can determine if the user has previously set up an account with the merchant (the user would have provided the portion of the real PAN when the account was set up, and merchant 20 would have stored the portion). If so, and if user 1 had logged into her account prior to navigating to the checkout page, then merchant 20 can easily identify the user's purchasing session from all of the active purchasing sessions, and can correlate the payment information from entity 80 to the correct purchase session and correct checkout page.

Once merchant 20 receives the dynamic payment information, the purchase transaction may be completed through the conventional credit card/debit card processing channels. In action A20, merchant 20 sends the transaction information, including the dynamic payment information for the user, to its acquiring bank 50, the acquiring bank 50 records the information (for later settlement purposes), and forwards the transaction information in action A21 to a payment processing network 70, which may be VisaNet™ as one example. If payment processing network 70 recognizes the PAN provided in the transaction information as a dynamic PAN, it may contact validation entity 80 in action A22 to ask for the real payment information. Validation entity 80 can check the dynamic PAN received from network 70 against its records, and provide network 70 with the corresponding real payment information in action A23. As another approach, validation entity 80 may forward the user's dynamic payment information along with the user's real payment information when the dynamic payment information is generated in action A17, thereby enabling actions A22 and A23 to be omitted. Network 70 may then check each transaction it receives against the information sets that it has received from entity 80 to find a match of the sets of dynamic payment information, and to substitute real payment information for the received dynamic payment information if a match is found. Network 70 and entity 80 may be owned and operated by the same service provider, and each may have their messages funneled through (e.g., passed through) a gateway server. Each of the authorization code and the decline code has a different format from that of the each of the above-described PANs. An authorization/decline code is less than 13 characters in length, and is typically 5 to 9 characters in length, and may include alpha characters and well as numeric digits.

Once payment processing network 70 has the real payment information, it can contact the issuing bank 60 for user 1 to seek approval for the transaction, as shown by action A24 in the figure. In some cases, issuing bank 60 may have previously given network 70 a set of criteria that network 70 can use to approve transactions on its own without seeking approval from the issuing bank for each transaction. If so, network 70 can approve or disapprove the transaction on its own using the pre-supplied criteria as part of action A24. In action A25, payment network 70 sends, along with an indication of the transaction, an authorization code to acquiring bank 60 if the transaction is approved or a declined code if the transaction is not approved. In action A26, acquiring bank 50 finds the record for the transaction based on the indication of the transaction sent by network 70, stores the authorization code or declined code in the found record, and forwards the received code to merchant 20, along with an indication of the transaction. Upon receiving the authorization or declined code, the merchant website 20 can send an indication to user 1 in action A27 as to whether the transaction was approved or declined.

Computer 10 and merchant website 20 may communicate with one another over a public communication network, which may include the Internet. Also, computer 10 and validation entity 80 may communicate with one another over a public communications network, which may include the Internet. Entitles 20, 50, 60, 70, and 80 may communicate with one another over a combination of one or more public and private communications networks, which may include the Internet. Virtual private networks may be established between these components, particularly over the segments that are public networks. Each of the above possible combinations of communication networks is generally denoted herein and in the figures by reference number 31.

An advantage of using dynamic payment information is that the real payment information (e.g., the above-mentioned user-specific payment information) is not compromised if a hacker is able to receive and decrypt the request message for dynamic payment information sent from secure element 40 to validation entity 80. This allows user 1 to continue to use her user-specific payment information (e.g., portable consumer device 5) in other commerce channels, such as in-store purchases, even if the hacker tries to use the dynamic payment information in a transaction. Enhanced protection is provided by using a dPAN instead of the real PAN in the dynamic payment information. Using the pseudo-PAN in the request messages to obtain dynamic payment information also has the above advantages of protecting the real PAN. As an additional advantage of using the pseudo-PAN, payment processing network 70 can be configured to send an alert message to validation entity 80 whenever a transaction is attempted to be processed through network 70 with the pseudo-PAN, and entity 80 can flag the user's account for potential fraud, and the operator of entity 80 can send the user an updated payment application program to install on secure element 40, with the updated payment application program having new encryption keys, and optionally a new unique identifier for secure element 40. In this manner, with the pseudo-PAN having the form of a PAN that can be processed by payment processing network 70, the pseudo-PAN further provides the advantage of detecting the hacking of communication messages between secure element 40 and validation entity 80. To further aid in this detection, secure element 40 may include a fake expiration date and fake CW value along with the pseudo-PAN in the request messages that it sends to entity 80. As indicated above, the account number of the user-specific payment information, and pseudo-PAN, and the dynamic PAN are each recognizable and processable by a card payment processing network 70 that processes credit-card and/or debit-card transactions, such as VisaNet™. (The payment processing network 70 is independent of the bank that issued the user-specified payment information, and the merchants involved with the user's transactions.) Also, each of the above account numbers (PAN) comprises a sequence of at least eleven numeric digits, preferably of 13 digits, and typically is a sequence of 15, 16, 17, 18, or 19 digits. These features of the account numbers enable the above requests to establish and receive a pseudo-PAN, to receive a dynamic PAN, and to use a dynamic PAN to all be processed through existing and legacy card payment networks without the need for significant changes the existing payment processing networks.

Figure 2:
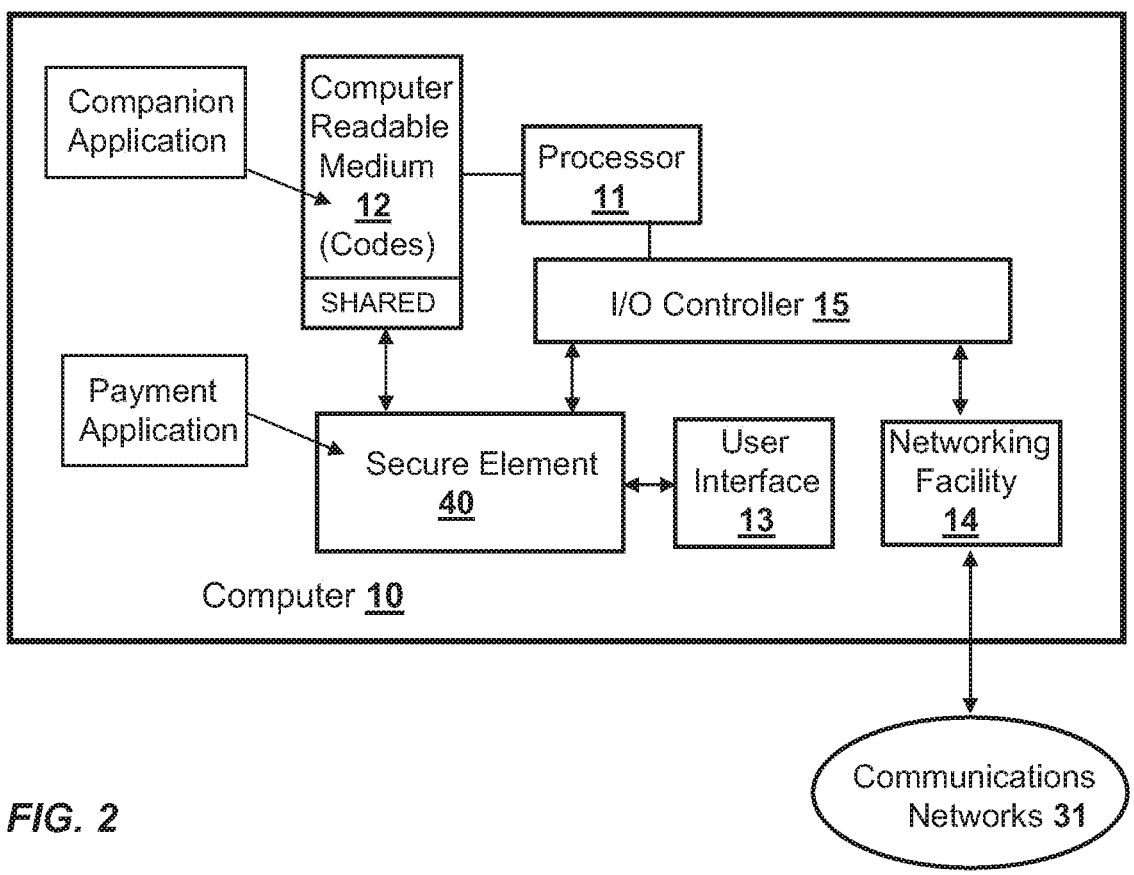
FIG. 2 shows an exemplary implementation of a computer having a secure element according to the present invention.

Having this provided a description of overall systems and methods, descriptions of the specific components is now provided. The user's computer 10 may comprise a desktop computer, a laptop computer, a smart phone, or any portable electronic device that has a networking facility. Referring to FIG. 2, an exemplary implementation of computer 10 has one or more processors 11, a tangible non-transitory computer-readable medium 12 coupled to processor(s) 11 that stores instruction codes (software) that direct processor(s) 11 and that stores data used by processor(s) 11, an I/O controller 15 that interfaces processor(s) 11 to a user interface 13, and a networking facility 14. User interface 13 comprises one or more video output devices (e.g., displays, screens) and one or more input devices (e.g., keyboard, mouse, trackball, etc.) for user 1 to receive information from computer 10 and to provide input to computer 10. Networking facility 14 may comprise software and hardware that enable a process running on computer 10 to communicate with a communications network so as to send and receive messages, data, and the like to one or more entities coupled to the communications network. The above components are found in conventional computers. As an unconventional feature, the exemplary implementation of computer 10 shown in FIG. 2 further comprises a secure element 40 of the type described above with reference to FIG. 1. Secure element 40 has its own processor and memory, as described below, or multiplexes the use of processor(s) 11 and computer-readable medium 12 in a secure manner that prevents the operating system from controlling it or accessing its memory. The above-described payment application is loaded into the memory of secure element 40, and executed by the processor of element 40. The data flowing between I/O controller 15 and user interface 13 goes through secure element 40 so that secure element 40 can provide visual information to the user via the computer's screen, and can receive user inputs from user interface 13 and prevent the inputs from being received by I/O controller 15 when secure element 40 is actively interfacing with the user. Secure element 40 can be integrally assembled with processor(s) 11 of computer 10, such as on the same semiconductor die or in the same semiconductor package, so that the processor 11 has to be damaged or destroyed in order to obtain the data and encryption keys stored in secure element 40.

Computer-readable medium 12 of computer 10 may comprise a combination of semiconductor memory and non-volatile storage, such as one or more disk drives and/or non-volatile memory. Computer-readable medium 12 stores an operating system for computer 10, which enables processes and applications to be run by processor(s) 11. The operating system provides services to these processes and applications, and enables these processes and applications to access components of user interface 13, portions of computer-readable medium 12, networking facility 14, peripheral interface 16, and other components of computer 10. The operating system may be complex and full featured, such as found on desk-top computers, or simplified, such as found on cell phones, PDAs, and many other types of portable electronic devices.

The companion application for element 40's payment application is loaded onto computer-readable medium 12, and is executed by processor(s) 11. Access to a small portion of computer-readable medium 12 may be shared with the processor of secure element 40. The payment application running on secure element 40 and the companion application running on processor(s) 11 can communicate with one another using the shared portion of medium 12. For example, each application may be assigned a "mail box" section and a "flag" section in the shared portion, with both sections being readable and writable by each application. When the payment application wants to send data and instructions to the companion application, it can write the instructions and/or data into the mailbox section for the companion application, and then write a data word to the "flag" section for the companion application that indicates that the mailbox has just been written to. The companion application can periodically check its flag section for such a data word, and when found, it can read its mail box, then erase the contents of its mail box section and reset its flag section to zero. The data word written to the flag section may be a non-zero integer value that indicates the number of words (or bytes) written to the mail box section. Before writing to the mailbox section of the companion application, the payment application can periodically read the flag section of the companion application, and can write the instructions and/or date when the flag section has a zero word value. In a similar manner, when the companion application wants to send data and instructions to the payment application, it can write the instructions and/or data into the mailbox section for the payment application, and then write a data word to the "flag" section for the payment application that indicates that the mailbox has just been written to. The payment application can periodically check its flag section for such a data word, and when found, it can read its mail box, then erase the contents of its mail box section and reset its flag section to zero. As above, the data word written to the flag section may be a non-zero integer value that indicates the number of words (or bytes) written to the mail box section. Before writing to the mailbox section of the payment application, the companion application can periodically read the flag section of the payment application, and can write the instructions and/or data when the flag section has a zero word value. The companion application may be downloaded and installed by the user before starting the set up process outlined in FIG. 1 (e.g., before action A1). The companion application may be configured by the operating system registry to run as a low-CPU level background process each time the computer is booted up.

Figure 3:
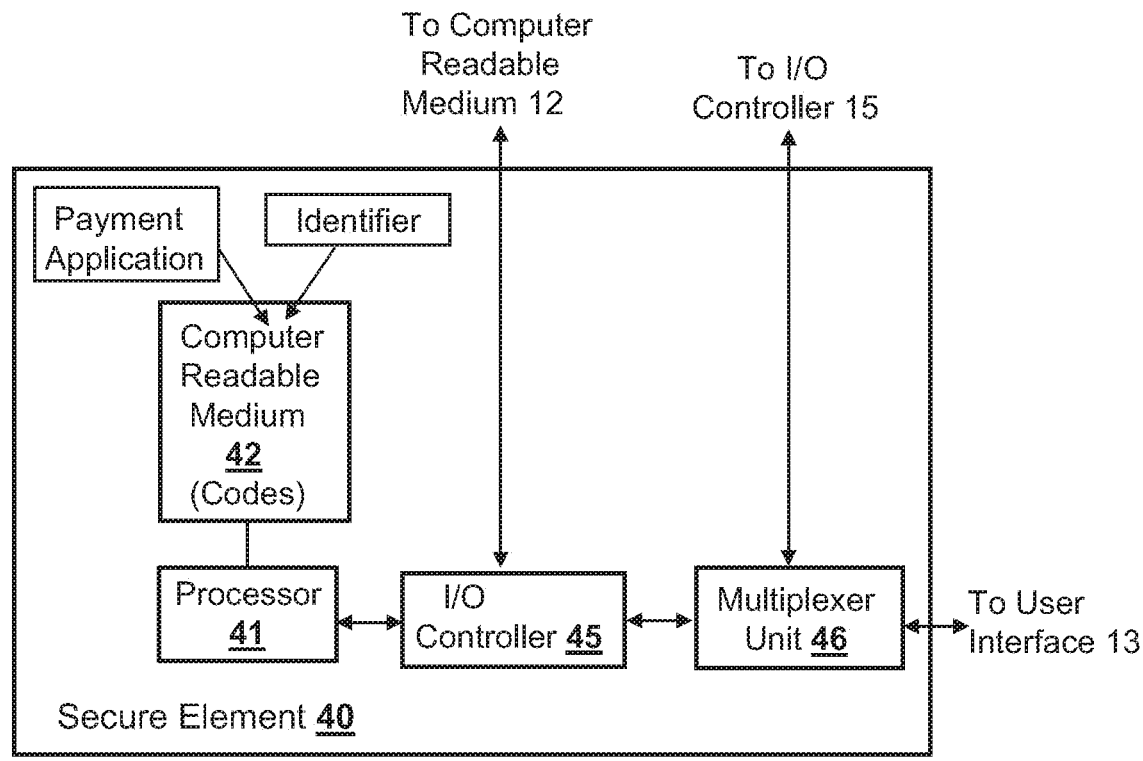
FIG. 3 shows an exemplary embodiment of a secure element according to the present invention.

FIG. 3 shows an exemplary embodiment of secure element 40. The exemplary embodiment comprises a processor 41, a tangible non-transitory computer-readable medium 42 coupled to processor 41 that stores instruction codes that direct processor 41 and that stores data used by processor(s) 41, an I/O controller 45 that interfaces processor 41 to computer-readable medium 12 and user interface 13 of computer 10, and a networking facility 14, and a multiplexer unit 46 that selectively connects user interface 13 to I/O controller 45 of secure element 40 when secure element 40 is interfacing with user 1, and that selectively connects user interface 13 to I/O controller 15 of computer 10 when secure element 40 is not interfacing with user 1. The payment application is stored in medium 42, and it comprises codes that direct processor 41 to perform the above-described tasks. The payment application also has encryption keys stored in medium 42 that it uses to encrypt communications to validation entity 80, and to decrypt communications from validation entity 80. These keys and the encrypting of the messages enable the secure element to keep the payment information secure from malware that may be running on the operating system of computer 10. The payment application can be loaded into memory 42 at the factory by the computer manufacturer, and it can also be loaded into memory 42 in the field by the user. For the latter case, the payment application, including user specific encryption keys, may be securely provided to the user on a CD-ROM or memory card, and user interface 13 can have a ROM drive or USB port that can allow the program to be securely transferred to memory 42 when secure element 40 is activated by the user. For this, and to provide a basic graphical user interface (GUI) to the user, a rudimentary operating system may be loaded onto memory 42 at the factory by the computer manufacturer, with the operating system being run by processor 41. The rudimentary operating system can be configured to provide a loading facility to load applications from secured devices of user interface 13 into memory 42.

The companion application is stored on the computer's medium 12 and comprises code that directs the computer's processor(s) 11 to establish and handle communications with validation entity 80 using networking facilities 14 of computer 10 and the shared portion of computer-readable medium 12. The companion application may also comprise code that directs the computer's processor(s) 11 to obtain the merchant identifier from the web browser running on the operating system, and to provide the merchant identifier to the secure element through the shared portion of medium 12. The companion application may also comprise code that directs the computer's processor(s) 11 to receive display dynamic payment information from secure element 40 through the shared memory, and to display it to the user, or to form fill the dynamic information into the checkout page of the merchant, as displayed by the user's browser. The companion application may also comprise code that directs the computer's processor(s) 11 to detect a specific keyboard sequence or combination of keys of the keyboard, and to send a message to secure element 40 to start its interface with the user and to decouple user interface 13 from the operating system. In view of this description, one of ordinary skill in the computer software art can readily create a set of instructions to implement the companion program without undue experimentation.

With regard to computer 10, networking facility 14 of computer 10 may comprise software and hardware that enable a process running on computer 10 to communicate with a communications network, such as network 31, to send and receive messages, data, and the like to one or more entities coupled to the communications network. The hardware of facility 14 may comprise dedicated hardware separate from processor(s) 11, or the shared use of processor(s)

11, or a combination thereof. The software of facility 14 may comprise firmware, software stored in computer-readable medium 12 or another computer-readable medium, portions of the operating system, or a combination of any of the preceding items. Networking facility 14 is preferably a non-exclusive resource, allowing access to the communications network by other processes and applications being run by computer 10.

The operating system of computer 10 comprises one or more software modules and application programs, generically called "network services modules" herein, that can access networking facility 14 and set up communications sessions to entities on communications network 31. Such network services modules include Microsoft's Windows Communications Foundation (e.g., .NET 3.0, .NET 4.0, etc.), Apple's CFNetwork Framework, the networking section of the Unix and Linux operating system kernels, the OS Services Layer and the Base Services Layer of the Symbian operating system, Internet browsers, and the like. Each of these network services modules is non-exclusive (e.g., capable of serving more than one processor and more than one process/application) and provides an application programming interface (API) to a collection of functions that a processor can access using respective function calls. With these API facilities, a collection of function calls can be readily constructed for a processor to execute that enables the processor to establish a communications channel with an entity on a communications network 31 coupled to networking facility 14, and to exchange messages and data with the entity. The companion application can have such a collection of function calls to the API of a network services module of computer 10, including one or more function calls that provide the universal resource identifier (URID) for validation entity 80 (as passed to the companion application by the payment application) and an instruction to establish a session with the validation entity. The session may be a secure socket layer (or secure transport layer) session (e.g., SSL session, STL session) with mutual authentication. As part of establishing the session in some implementations, the companion application may include directing data processor 41 to provide, or to cause to be provided, a network address for the computer's network services module to validation entity 80. The network address may be static or dynamic, the latter of which may be obtained through API function calls to the computer's network services module. The network address may an IP address.

If the companion application wishes to use an Internet browser for a network services module, it may further comprise API function calls to the computer's operating system to initiate an instance of the browser and provide it with access to the browser instance. In some implementations, such as when the payment application in secure element 40 stores the URID of validation entity 80, the companion application may direct the data processor 41 to establish communications with validation entity 80 well before user 1 invokes secure element 40 to request it to pay for a transaction. The companion application and validation entity 80 may keep the communications session active until the user makes such a request, and between requests, by intermittently exchanging "heartbeat" messages. For example, the companion application may periodically, aperiodically, or randomly send messages to validation entity 80 confirming its presence in the session, and validation entity 80 may send a reply message confirming its presence in the session.

Referring back to FIG. 3, secure element 40 comprises various codes embodied on computer-readable medium 42 that direct data processor 41 to perform respective actions. A first code directs data processor 41 to communicate with computer 10 by way of the companion application so as to gain access networking facility 14 of computer 10. The first code may comprise code that directs data processor 41 to send and receive instruction and data by way of the above-described mailbox and flag section of the shared portion of medium 12, and may include instructions the direct processor 41 to carry out the above-described actions of the exchange protocol. The companion application may comprises a collection of instructions that enables the element's data processor 41 to make function calls to various application program interfaces (API's) of the computer's operating system, such as those related to networking and accessing networking facility 14. In this manner, the element's data processor 41 can sent function calls intended for computer 10 to the companion application, and the companion application can submit the function calls to the operating system of computer 10 on behalf of the processor 41, and can receive the results of the function calls and forward them to processor 41.

Another code of the payment application on secure element 40 directs data processor 41 to establish communications with validation entity 80 using networking facility 14 of computer 10. This can be done by providing a URL of entity 80 to the companion application and directing the companion application to establish the communications with entity 80.

Other codes of the payment application direct data processor to establish a first secure interface with user 1 to receive the information described above pertaining to the user's portable consumer device 5, to encrypt this information and an identifier of the secure element with an encryption key stored in medium 42, to provide this encrypted information to the companion application with an instruction that it is to send it to validation entity 80 (so as to obtain a pseudo-PAN), to receive back an encrypted message from entity 80 by way of the companion application, to decrypt the encrypted message and extract the pseudo-PAN, and to store the pseudo-PAN. These codes may comprises: code that directs data processor 41 to receive a real account number and at least one of an expiration date, a card verification value, or a billing ZIP code of user-specific payment information; code that directs data processor 41 to obtain an identifier for secure element 40; code that directs data processor 41 to send the received real account number, the received at least one of an expiration date, a card verification value, or a billing ZIP code, and the obtained identifier for the secure element to validation entity 80; code that directs data processor 41 to receive, in response, a pseudo account number from the validation entity 80, the received pseudo account number being different from the real account number of the user-specific payment information; and code that directs data processor 41 to store, in memory 42 of the secure element, the received pseudo account number. The payment application may be stored in a non-volatile section of memory 42, and may contain the unique identifier for secure element 40. This allows the value of the identifier to be updated with a reloading of the payment application, such as when fraudulent activity is detected by entity 80. As another approach, the unique identifier for secure element 40 may be stored by the manufacturer of element 40 in non-volatile part of memory 42 that is separate from the location where the payment application is stored. As another approach, the identifier may be a combination of a number stored with the payment application and a number stored by the manufacturer in a part of memory 42 that is separate from the payment application.

Additional codes of the payment application direct data processor to establish a second secure interface with user 1 at a later date to receive a request to obtain dynamic payment information, which may include receiving a selection of an pseudo-PAN account from the user, to encrypt this pseudo-PAN and an identifier of the secure element with an encryption key stored in medium 42, to provide this encrypted information to the companion application with an instruction that it is to send it to validation entity 80 (so as to obtain the dynamic payment information), to receive back an encrypted message from entity 80 by way of the companion application, to decrypt the encrypted message and extract the dynamic payment information. These codes may also include instructions that direct data processor 41 to send a message to the companion application with an instruction to find and provide it with the merchant identifier associated with the active merchant checkout page, encrypting the merchant identifier, and sending the encrypted merchant identifier to entity 80 with the other data in the request. Additional instructions may direct data processor 41 to display the decrypted dynamic payment information to the user, or to send the decrypted dynamic payment information to the companion application with an instruction that the companion application display the dynamic payment information in a window, or to direct the companion application to fill the dynamic payment information into the merchant checkout page. These codes collectively comprise at least: code that directs data processor 41 to send, from the secure element of a computer, a representation of the pseudo account number to a validation entity; and code that directs data processor 41 to receive, in response, dynamic payment information from the validation entity, the received dynamic payment information having an account number that is different from the pseudo account number.

In establishing the above secure interfaces with the user, data processor 41 can send and instruction to multiplexer unit 46, by way of I/O controller 45, to prevent inputs from user interface 13 from reaching the I/O controller 15 of computer 10.

The above codes, instructions, and actions of the payment application and the companion application can be readily implemented with conventional I/O instructions, database function calls, network function calls, memory access instructions, CPU arithmetic instructions, CPU logic instructions, and CPU control instructions. In view of this disclosure, these codes, instructions, and actions may be implemented by one of ordinary skill in the art without undue experimentation. Data processor 41 may be implemented with one CPU or multiple CPUs.

Figure 4:
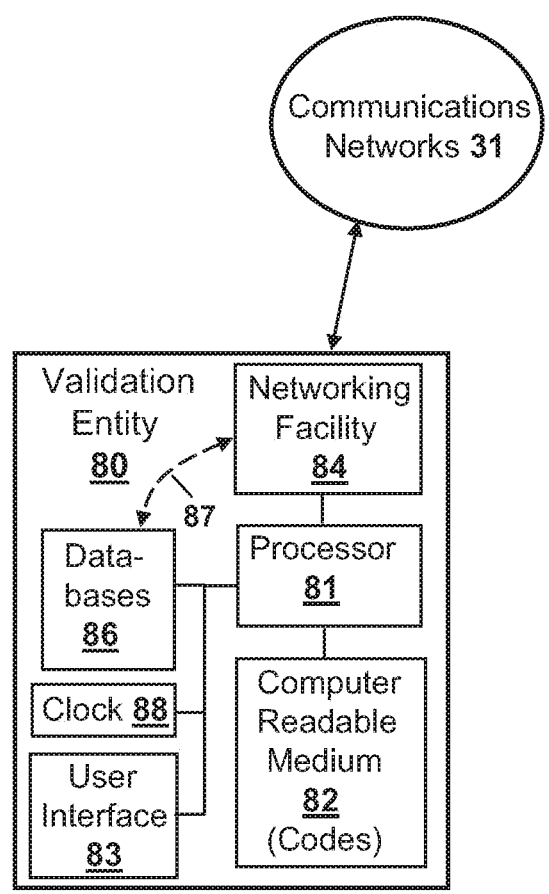
FIG. 4 shows an exemplary embodiment of a validation entity according to the present invention.

Having described various embodiments and implementations of secure element 40, various embodiments and implementations of validation entity 80 are now described with reference to FIG. 4. Validation entity 80 comprises a system having one or more servers coupled to a communications network 31 that can receive a request from a secure element 40 to process, and to provide the appropriate data depending upon the request, as described above. One of the servers of entity 80 is shown in FIG. 4; the server comprises one or more processors 81 electrically coupled to each of a tangible computer-readable medium 82, a user interface 83, one or more databases 86, and a networking facility 84, the latter of which is coupled to one or more communications networks 31 so that it can communicate to computer 10, merchant 20, payment processing network 70, and banks 50 and 60. User interface 83 comprises one or more video output devices (e.g., displays, screens) and one or more input devices (e.g., keyboard, mouse, trackball, etc.), which enable an administrator of entity 80 to receive information from the server and to provide input to the server. Computer-readable medium 82 may comprise a combination of semiconductor memory and non-volatile storage, such as one or more disk drives and/or non-volatile memory. Data processor 81 may be implemented with one CPU or multiple CPUs.

Computer-readable medium 82 stores an operating system for the server, which enables processes and applications to be run by processor(s) 81, and enables codes for directing the operation of processor(s) 81 to be run. The operating system provides services to these processes and applications, and enables these processes and applications to access components of user interface 83, portions of computer-readable medium 82, networking facility 84, and other components of entity 80. The operating system may be full featured. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of entity 80 also comprises one or more network services modules that can access networking facility 84 and set up communications sessions to entities on the communications networks 31. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 81 can call in order to manage communications with another entity. With these API facilities, a collection of API function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 4. Validation entity 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

Validation entity 80 can process requests transmitted from a plurality of different secure elements 40 (e.g., millions of elements), and can process any number of transmissions by a particular element 40. As described above, there are two basic types of requests: (1) a request to obtain a pseudo-PAN for a real account (e.g., account of portable consumer device 5), and (2) a request to obtain dynamic payment information (e.g., a d-PAN) corresponding to a pseudo-PAN. The former may be referred to as a pseudo-PAN request, and the latter may be referred to as a dynamic-information request. Validation entity 80 applies one or more validation tests to secure element 40 and/or the information in its requests to obtain a level of confidence that the requests are legitimate. When the one or more validation tests are passed, and preferably when none of the tests are failed, validation entity 80 sends the requested data to secure element 40, and optionally to payment processing network 70 along with the real account number (e.g., real PAN) associated with the request. For these tasks, validation entity 80 may comprise code embodied on computer-readable medium 82 that directs data processor 81 to communicate with computer 10 and secure element 40 using networking facility 84 over communications network 31. This code may include instructions that establish a communications session with computer 10, including the option of establishing an SSL/STL session with mutual authentication and encryption based on a triple DES algorithm, and instructions for sending and receiving messages to secure element 40 through the communications session. Validation entity 80 may further comprise code embodied on computer-readable medium 82 that directs data processor 81 to receive encrypted requests sent by secure element 40, and code that directs data processor 81 to decrypt the encrypted information in the requests. This information may be encrypted by a session key of an SSL/STL session or by an encryption key stored in secure element 40 and known to validation entity 80, or may be doubly encrypted by both keys. The latter key may be uniquely assigned to the secure element. Validation entity 80 may further comprise code embodied on computer-readable medium 82 that directs data processor 81 to apply one or more validation tests as described below, and to send the requested data to secure element 40, and optionally to payment processing network 70, if a selected number of validation tests are passed. Data processor 81 may access databases 86 in performing the one or more validation tests. The validation tests and codes therefor are described below in greater detail. The above codes and codes described below for validation entity 80 may be implemented in any number of programming languages. They can be implemented with conventional I/O instructions, database function calls, network function calls, memory access instructions, CPU arithmetic instructions, CPU logic instructions, and CPU control instructions. Furthermore, one of ordinary skill in the art will be readily able to construct instructions to implement these codes in view of this disclosure without undue experimentation.

A first validation test that validation entity 80 may apply pertains to verifying that secure element 40 is authentic. Validation entity 80 may maintain a first database 86 of valid identifiers of the secure elements, and this database may also include indications of whether a valid identifier has been associated with fraudulent activity. The first validation test may comprise determined whether the received identifier of secure element 40 is in the first database 86 of valid identifiers. If it is, the first validation test is passed; if not, it is failed. If the first validation test is failed, validation entity 80 may record the identifier of the failed secure element 40 and the source IP address from which the failed secure element 40 made the request in a third database 86 described below. A second validation test that validation entity 80 may apply pertains to verifying that secure element 40 has not been involved in fraudulent transactions. For this, validation entity 80 may also have a second database 86 that tracks the identifiers of secure elements 40 that have been used in fraudulent activities, and may check the identifier of secure element 40 against this database. If the identifier in the request is found in the second database, the second validation test is deemed to have failed. The second validation test may further comprise checking the element's identifier and/or the IP address from which an incoming request was originated (the source IP address of the message) against the previously-described third database 86 that stores element identifiers and IP addresses associated with requests that have failed the first validation test. If an element identifier or IP address is found in this database, the second validation test is deemed to have been failed. Checking the element identifiers and/or the IP addresses in this way prevents replay attacks by fraudsters. It may be appreciated that the second and third databases 86 into a single database generically termed as a database of identifiers of suspicious secure elements. If the first and second validation tests are passed, validation entity 80 may send the pseudo account number or dynamic payment information, depending upon the type of received request, to secure element 40, or may apply the additional validation tests described below before sending the information.

When validation entity 80 receives a pseudo-PAN request from secure element 40 for a pseudo-PAN, the request will have the real account number (e.g., real PAN) of the portable consumer device 5, and additional information, which is at least one of an expiration date, a card verification value, or a billing ZIP code associated with device 5. As a third validation test, in addition to conducting the above first and second validation tests, entity 80 may access its database 86 of user account information or contact the bank that issued the user-specific payment information (e.g., device 5), thereby obtaining the information record for the real PAN provided in the pseudo-PAN request, and can compare the additional information provided in the pseudo-PAN request (e.g., expiration date, card verification value, and/or a billing ZIP code) against the values in the obtained information record. If the additional information in the pseudo-PAN request does not fully match the information in the obtained information record, the third validation test can be deemed to have been failed, and the pseudo-PAN request is rejected. If the additional information fully matches the information in the obtained information record, third validation is passed, and validation entity 80 may proceed to provide secure element 40 with a pseudo-PAN corresponding to the real PAN, and may create a record in a fourth database 86 that associates the issued pseudo-PAN with the user account of device 5 (e.g., with the real PAN of the user-specific payment information), and with the received identifier for secure element 40. As an option, validation entity may conduct a fourth validation test after the third test before providing the pseudo-PAN to secure element 40. In this test, the issuing bank and/or payment network 70 and/or validation entity 80 may limit the number of computers with secure elements 40 that user 1 can use with a particular instance of user-specific payment information (e.g., that user 1 can use with a particular portable consumer device 5). As the forth validation test, entity may access a fifth database 86 to determine if a limit on the number of secure elements 40 has been placed on the received instance of user-specific payment information (e.g, device 5). if so, entity 80 can access the aforementioned fourth database 86 to see how many secure elements have already been associated with the received instance of user-specific payment information (e.g., with the real PAN for device 5). If the limit has not yet been reached, entity 80 proceeds with providing the pseudo-PAN to secure element 40 and updating the fourth database 86 to include the new pseudo-PAN and the identifier of the secure element 40 to which the pseudo-PAN has been provided. Entity 80 also updates the fourth database 86 to increment the number of secure elements associated with device 5. It may be appreciated that the fourth and fifth databases 86 may be combined together into a single database.

When validation entity 80 receives a dynamic-information request from secure element 40 for dynamic payment information, the request will have pseudo-PAN and the identifier of secure element 40 that made the request. As a fifth validation test, in addition to conducting the above first and second validation tests, entity 80 may access its fourth database 86 to obtain the record for the received pseudo-PAN, obtain the identifiers for all of the secure elements that have been previously associated with the received pseudo-PAN (as associated by the processing of the above pseudo-PAN requests), and to compare the identifier for secure element 40 received in the dynamic-information request against the identifier(s) in the accessed record for a match of identifiers. If no match is found, the fifth validation test is deemed to have failed, and validation entity 80 can record the received identifier for element 40 in the above-mentioned second database 86 of secure elements associated with fraudulent transactions. If a match is found, validation entity 80 can send the dynamic payment information (e.g., d-PAN, dCVV2, and dynamic expiration date) to secure element 40, can record the contents of the issued dynamic payment information and the indication of the corresponding customer account for device 5 (e.g., with the real PAN of the user-specific payment information), in a sixth database 86, and can optionally send the dynamic payment information and the real payment information (i.e., the user-specific payment information) to payment processing network 70 with an indication that the dynamic data will be used soon in a transaction to be processed by network 70.

As described above, validation entity 80 may send to secure element 40 the user's shipping address information and/or billing address information that has been previously associated to user 1. The association may be stored in a database 86 of validation entity 80 or at the issuing bank 60 for the user's portable consumer device 5. Validation entity 80 may further comprise code that directs data processor 81 to obtain address information for the consumer account indicated by the pseudo account number in the received request, either from a database 86 or from an issuing bank 60, and to send the address information to element 40 along with the dynamic payment information when the selected number of validation tests have been passed, as described above. The above codes and actions can be implemented with conventional I/O instructions, database function calls, network function calls, memory access instructions, CPU arithmetic instructions, CPU logic instructions, and CPU control instructions. In view of this disclosure, the codes may be implemented by one of ordinary skill in the art without undue experimentation.

As indicated above, validation entity 80 may be configured to send a dynamic account number (dPAN) to secure element 40 and the payment processing network 70 along with a dCVV2 value and/or a dynamic expiration date. Validation entity 80 may contact the issuing bank 60 for device 5 to obtain the dPAN, or may read it from a list of dPANs previously sent to entity 80 by bank 60 or created by entity 80 or network 70, or may generate it from an algorithm previously provided to entity 80 by bank 60. Validation entity 80 may comprise code embodied on computer-readable medium 82 that directs data processor 81 to execute these actions, as desired by the issuing bank. When payment processing network 70 received the dCCV2 value, dPAN value, and the account number for device 5, it may forward all three datum to the issuing bank 60 so that the issuing bank can correlate the dPAN to the account number of device 5.

To perform the above actions and tasks, validation entity 80 may comprises a computer program product installed on its computer-readable memory 82. The computer program product may comprise: code that directs data processor 81 to receive a request from a secure element 40 of a computer to provide a pseudo account number, the request including an identifier of the secure element, and a real account number (PAN) and at least one of an expiration date, a card verification value, or a billing ZIP code of an instance of user-specific payment information; code that directs data processor 81 to apply at least one validation test pertaining to the received request; code that directs data processor 81 to send, if the at least one validation test is passed, a pseudo account number to the secure element; and code that directs data processor 81 to store the pseudo account number with an indication of at least the received real account number in one of its databases 86. The program may further comprise: code that directs data processor 81 to receive a request from a secure element 40 of a computer to provide dynamic payment information, the request including a pseudo account number and an identifier of the secure element; code that directs data processor 81 to apply at least one validation test pertaining to the received request; and code that directs data processor 81 to send, if the at least one validation test is passed, dynamic payment information to the secure element. The computer program product may further comprise code that directs data processor 81 to receive a request from a payment processing network 70 to provide real payment information corresponding to an instance of dynamic payment information; and code that directs data processor 81 to provide the requested real payment information to the payment processing network 70.

The further embodiments of the computer program product may be adapted to convey the payment information directly to the merchant, and to a payment processing network. For example, a further computer program product may comprise: code that directs data processor 81 to receive a request from a secure element of a computer to provide dynamic payment information, the request including a pseudo account number, an identifier of the secure element, and an identifier of a merchant; code that directs data processor 81 to apply at least one validation test pertaining to the received request; and code that directs data processor 81 to send, if the at least one validation test is passed, dynamic payment information to a merchant indicated by the received merchant identifier. In another embodiment, such a computer program produce may comprise: code that directs data processor 81 to receive a request from a secure element of a computer to provide dynamic payment information, the request including a pseudo account number, an identifier of the secure element, and an identifier of a merchant; code that directs data processor 81 to apply at least one validation test pertaining to the received request; code that directs data processor 81 to send, if the at least one validation test is passed, dynamic payment information to secure element 40; and code that directs data processor 81 to send, if the at least one validation test is passed, the dynamic payment information and an indication of the identity of the merchant to a payment processing network 70.

The above described validation tests can be implemented by the following instructions of the computer program product. The first validation test can be implemented by instructions that direct data processor 81 to compare the receive identifier of the secure element 40 against a database of valid identifiers to find a match, the first validation test being passed if a match is found, otherwise failed. The second validation test can be implemented by instructions that direct data processor 81 to compare the receive identifier of the secure element against a database of identifiers of secure elements involved in prior fraudulent activity, the second validation test being failed if a match is found, otherwise passed. The instructions for the second validation test may also include instructions that direct data processor 81 to compare the IP address of the request sent by the secure element 40 against a database of IP addresses that have been associated with fraudulent activity, the second validation test being failed if a match in this database is found. The third validation test may be implemented by first instructions that direct data processor 81 to obtain the real payment information for the received account number of the user-specific payment information (e.g., portable consumer device 5) from a database or the bank that issued the user-specific payment information (e.g., device 5); and second instructions that direct data processor 81 to compare the received at least one of an expiration date, a card verification value, or a billing ZIP code to the real payment information for the received account number for a match, the third validation test being passed if a match is found, otherwise failed.

The fourth validation test can be implemented by first instructions that direct data processor 81 to access a database to determine the limit on the number of secure elements has been placed on the received real account number; second instructions that direct data processor 81 to access a database to determine the current number secure elements have already been associated to the received real account number; and third instructions that direct the data processor to compare the current number to the limit to determine if an additional association of a secure element would exceed the limit. If the limit would be exceeded, the fourth validation test is failed, otherwise it is passed. If a real account number is not eligible to be used with secure elements (e.g., the portable consumer device 5 is not enrolled in the program), then the limit for the account number may be set to zero, or the limit may be taken as zero if the account number is not in the database.

The fifth validation test can be implemented by first instructions that direct data processor 81 to access a database to obtain the record for the received pseudo account number; second instructions that direct data processor 81 to obtain from the record the identifiers for all of the secure elements 40 that have been previously associated with the received pseudo account number; and third instructions direct the data processor 81 to compare the identifier for the secure element received in the request against each identifier in the accessed record for a match. If a match is found, the fifth validation test is passed, otherwise it is failed.

Validation entity 80 may further comprise code that directs data processor 81 to receive a message from a payment processing network 70 that a transaction using a pseudo-PAN has been attempted, and code that directs data processor 81 to send an alert notification to the user to which the pseudo-PAN has been assigned, or the issuing bank of the user-specific payment information to which the pseudo-PAN has been assigned. The alert notification can indication that user's payment application should be replaced so as to provide new encryption keys, and optionally a new identifier for the secure element.

The above codes of the various embodiments of computer program products can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

It should be understood that various embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this patent application, may be implemented as software code to be executed by a processor using any suitable computer language such as, for example, C, C++, C#, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method performed by a server computer, the method comprising:
    receiving, by the server computer, a pseudo account number from a user computer operated by a user, the pseudo account number being associated with and being different than a real account number;
    in response to receiving the pseudo account number, transmitting, by the server computer to the user computer, dynamic payment information in response to receiving the pseudo account number, wherein the dynamic payment information comprises a dynamic account number, wherein the dynamic account number and the pseudo account number are different; and
    receiving, by the server computer, the dynamic payment information via a merchant computer after the merchant computer receives the dynamic payment information from the user computer, and exchanging the dynamic payment information with the real account number during a transaction.

2. The method of claim 1, wherein the user computer is a mobile phone.

3. The method of claim 1, wherein the server computer is a validation entity computer.

4. The method of claim 1 further comprising:
transmitting, by the server computer, the pseudo account number to the user computer.

5. The method of claim 1, wherein the pseudo account number is 16 digits.

6. The method of claim 1, wherein the user computer comprises a secure element and the user computer stores the pseudo account number in the secure element.

7. The method of claim 1, wherein the dynamic account number and the pseudo account number are in the same format.

8. The method of claim 1, further comprising:
transmitting the real account number to a payment processing network.

9. The method of claim 1, wherein the user computer comprises a secure element and wherein the pseudo account number is stored in the secure element.

10. The method of claim 9, wherein the secure element comprises a data processor, an input/output controller, and a multiplexer.

11. The method of claim 9, wherein the dynamic account number, the pseudo account number, and the real account number, are each 15-19 digits in length.

12. A method comprising:
providing, by a user computer operated by a user, a pseudo account number to a server computer, wherein the pseudo account number is associated with and is different than a real account number;
receiving, by the user computer, dynamic payment information in response to providing the pseudo account number, wherein the dynamic payment information comprises a dynamic account number, wherein the dynamic account number and the pseudo account number are different; and
providing, by the user computer, the dynamic payment information in a transaction to the server computer via a merchant computer after the merchant computer receives the dynamic payment information from the user computer, wherein the server computer thereafter exchanges the dynamic payment information with the real account number during the transaction.

13. The method of claim 12 wherein the user computer is a mobile phone.

14. The method of claim 12, wherein the merchant computer operates a merchant Website.

15. The method of claim 12 wherein the user computer comprises a secure element and wherein the pseudo account number is stored in the secure element.

16. The method of claim 12 further comprising:
receiving, by the user computer, the pseudo account number from the server computer.

17. A server computer comprising:
a processor; and
a computer readable medium coupled to the processor, the computer readable medium comprising code, executable by the processor for implementing a method comprising
receiving, by the server computer, a pseudo account number from a user computer operated by a user, the pseudo account number being associated with and being different than a real account number,
in response to receiving the pseudo account number, transmitting, by the server computer to the user computer, dynamic payment information in response to receiving the pseudo account number, wherein the dynamic payment information comprises a dynamic account number, wherein the dynamic account number and the pseudo account number are different; and
receiving, by the server computer, the dynamic payment information from the user computer via a merchant computer after the merchant computer receives the dynamic payment information from the user computer, and exchanging the dynamic payment information with the real account number during a transaction.

18. The server computer of claim 17, wherein the user computer is a mobile phone.

19. The server computer of claim 17, wherein the server computer is a validation entity computer.

20. The server computer of claim 17, wherein the pseudo account number is 16 digits.

* * * * *